United States Patent
Baird

(10) Patent No.: US 12,219,016 B2
(45) Date of Patent: *Feb. 4, 2025

(54) CAPTURE AND DISTRIBUTION OF REAL-TIME MOTION AND MULTIMEDIA CONTENT FOR LIVE DISTRIBUTION

(71) Applicant: GLITCH, LLC, Statesville, NC (US)

(72) Inventor: Avery Baird, North Saanich (CA)

(73) Assignee: Glitch, LLC, Statesville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/440,679

(22) Filed: Feb. 13, 2024

(65) Prior Publication Data

US 2024/0187487 A1 Jun. 6, 2024

Related U.S. Application Data

(63) Continuation of application No. 18/211,041, filed on Jun. 16, 2023, now Pat. No. 11,936,735.

(60) Provisional application No. 63/353,255, filed on Jun. 17, 2022.

(51) Int. Cl.
*H04L 67/131* (2022.01)

(52) U.S. Cl.
CPC .................. *H04L 67/131* (2022.05)

(58) Field of Classification Search
None
See application file for complete search history.

(56) References Cited

U.S. PATENT DOCUMENTS

| | | | |
|---|---|---|---|
| 9,124,357 B2 | 9/2015 | Jia et al. | |
| 2004/0224740 A1 | 11/2004 | Ball et al. | |
| 2014/0215508 A1 | 7/2014 | Wyatt et al. | |
| 2017/0372523 A1 | 12/2017 | Espeset et al. | |
| 2018/0343473 A1* | 11/2018 | Jeong | H04N 21/4223 |
| 2019/0347166 A1 | 11/2019 | Chen et al. | |
| 2019/0373237 A1* | 12/2019 | Limame | H04N 9/8715 |
| 2021/0097893 A1* | 4/2021 | Klappert | G06F 16/9024 |
| 2021/0354307 A1* | 11/2021 | Kim | B25J 11/0035 |
| 2022/0074756 A1* | 3/2022 | Gewickey | G06Q 50/14 |
| 2022/0224963 A1* | 7/2022 | Herz | G06Q 30/0269 |
| 2024/0196026 A1* | 6/2024 | Zink | H04N 21/816 |

* cited by examiner

*Primary Examiner* — Quang N Nguyen
(74) *Attorney, Agent, or Firm* — Angela Holt; Bradley Arant Boult Cummings LLP

(57) ABSTRACT

A method for capturing real-time motion data events from a remotely deployed far edge compute node on a remote asset, such as a racing vehicle, allows for real-time motion simulation of a racing experience. In the method, incoming audio and video data are received from the far edge compute mode, along with incoming motion data. The motion data is imbedded within data frames of the audio/video to create distributable content. The content may be distributed via a content distribution service for real-time, livestream experiences in a motion simulator, or for later playback in a motion simulator.

12 Claims, 4 Drawing Sheets

CAPTURE AND DISTRIBUTION OF REAL-TIME MOTION AND MULTIMEDIA CONTENT FOR LIVE DISTRIBUTION

REFERENCE TO RELATED APPLICATIONS

This application is a continuation of, and claims priority to U.S. Non-Provisional patent application Ser. No. 18/211,041 titled "Capture and Distribution of Real-Time Motion and Multimedia Content for Live Distribution," and filed on Jun. 16, 2023, which claims priority to U.S. Provisional patent application No. 63/353,255, titled "Capture and Distribution of Real-Time Motion and Multimedia Content for Live Distribution," and filed on Jun. 17, 2022. Both applications are incorporated herein by reference.

BACKGROUND AND SUMMARY

Racing simulators provide users with the motion and feel of auto racing. Users may sit in motion simulators that vibrate, tilt, and rotate in providing the users with the experience of race car driving. Simulator technology has evolved to the point where users can experience recreations of specific races driven by their favorite drivers. To accomplish this, the driver's cars are equipped with sensors and recording devices that record and transmit haptic data and video data that can be "replayed" on the motion simulators.

However, to date no known racing simulators have been able to receive race car data real-time, such that users can experience races as they are actually taking place. The system and method of the present disclosure provides such an experience. The system captures real-time motion and multimedia content from sensors and cameras embedded within a portable far edge compute node installed in a remote asset such as a racing vehicle. Motion and multimedia content is broadcast in real-time over a wireless IP network, or replayed from recorded sources on a system with actuators and audio/video system components such as a full motion racing simulator. Video frames can be synced with motion events using a data field extension within a standard video codec.

Telemetry values are captured from a sensor such as a Bosch BNO055 or similar. Sensor data value types captured from the sensors within the far edge compute node deployed onboard the remote asset include linear velocity, vibration, thermal temperature, battery voltage, accelerometer movement (x,y,z coordinates), gyroscopic and analog audio. Data events are captured from the sensor source, transformed using algorithmic mechanisms and published to channels on an event broker/data queuing service such as MQTT using data streams. A producer/consumer model has been adopted that utilizes an event driven architecture executed with container-based microservices. Each event-driven microservice subscribes to channel a source available on the queuing service. Microservices expose transformed event data values using a standard Application Program Interface (API) that provide input values for programs used to drive motion actuators attached to the full motion racing simulator system.

Multimedia including camera and audio sources are synced with motion events. Each video frame is encoded using a standard codec, such as an MP4. Event driven microservices capture motion events from sensor sources and add data field values into video codecs using available metadata extensions. Video frames are usually captured at a lower unit per second fidelity than the motion events. Therefore a collection (tuple) of motion events can be synced with an individual video frame in a many to one (M:1) association.

Syncing of video frames and motion events allows for an ability to stream content using existing and broadly adopted content streaming platforms such as Peacock, Twitch, Dirt, Google, Stadia, Netflix, Disney, YouTube, and the like. End user systems without an ability to consume motion data value extensions, such as a mobile phone, will simply ignore motion data events while playing the video frames. Motion capable end user systems with motion actuators such as a racing simulator will make use of both motion data values and video frames. The motion data content source can be either directly from the queuing service as a subscriber of a channel or as data value extensions to the multimedia codec.

It is an objective of the present disclosure to provide a system and method for capturing and transforming motion data events to be published toward a queuing system for distribution of motion data events to subscribing services of specific queuing service channels. Distribution will be executed in real-time from the far edge compute node toward the queuing service. Many subscribing services will capture data from specific channels for specific purposes including:

Real-time distribution of motion data events to systems controlling actuator motors.

Recording services that store motion data events for future playback on actuator motors.

Recording services that store motion data events for data analysis including but not limited to predictive failure analysis, artificial intelligence and machine learning algorithms.

Transformation services that embed one or more motion data events into tuples that are associated with a specific video frame using codec metadata extensions.

Specific data source targets have been considered where the far edge compute node with embedded sensors that capture motions events will be placed into:

Remotely operated asset such as a remote control (RC) vehicle.

Human driver or remotely operated asset such as a full-scale race car vehicle.

Human driver or remotely operated asset such as industrial heavy equipment including skid steers, forklifts, dozers, haulers, graders, trains or similar rail deployed assets.

Specific systems with actuator motors that consumer and execute computer readable formats to driven movement on the actuator include (but is not limited to):

Prosimu motion capable racing simulators.

Motion capable racing simulators with motion actuators.

Specific video streaming platforms that support data value codec extensions include (but are not limited to):

MP4 video streamed using Nginx web site and ffmpeg executable and ffplay client.

Unity gaming platform with embedded codec delivered over HTTP.

H.264 and H.265 (HEVC) codec supported content streaming platforms such as Twitch, Netflix, Prime Video, YouTube and others.

Specific queueing service platforms intended for use with the microservices that publish and subscribe to specific channels on the queue may include open source MQTT variants such as Mosquitto, commercially available cloudbased services such as Google Cloud IoT, Amazon AWS IoT Core, Microsoft Azure IoT Hub, and the like.

DETAILED DESCRIPTION

Figure 1:
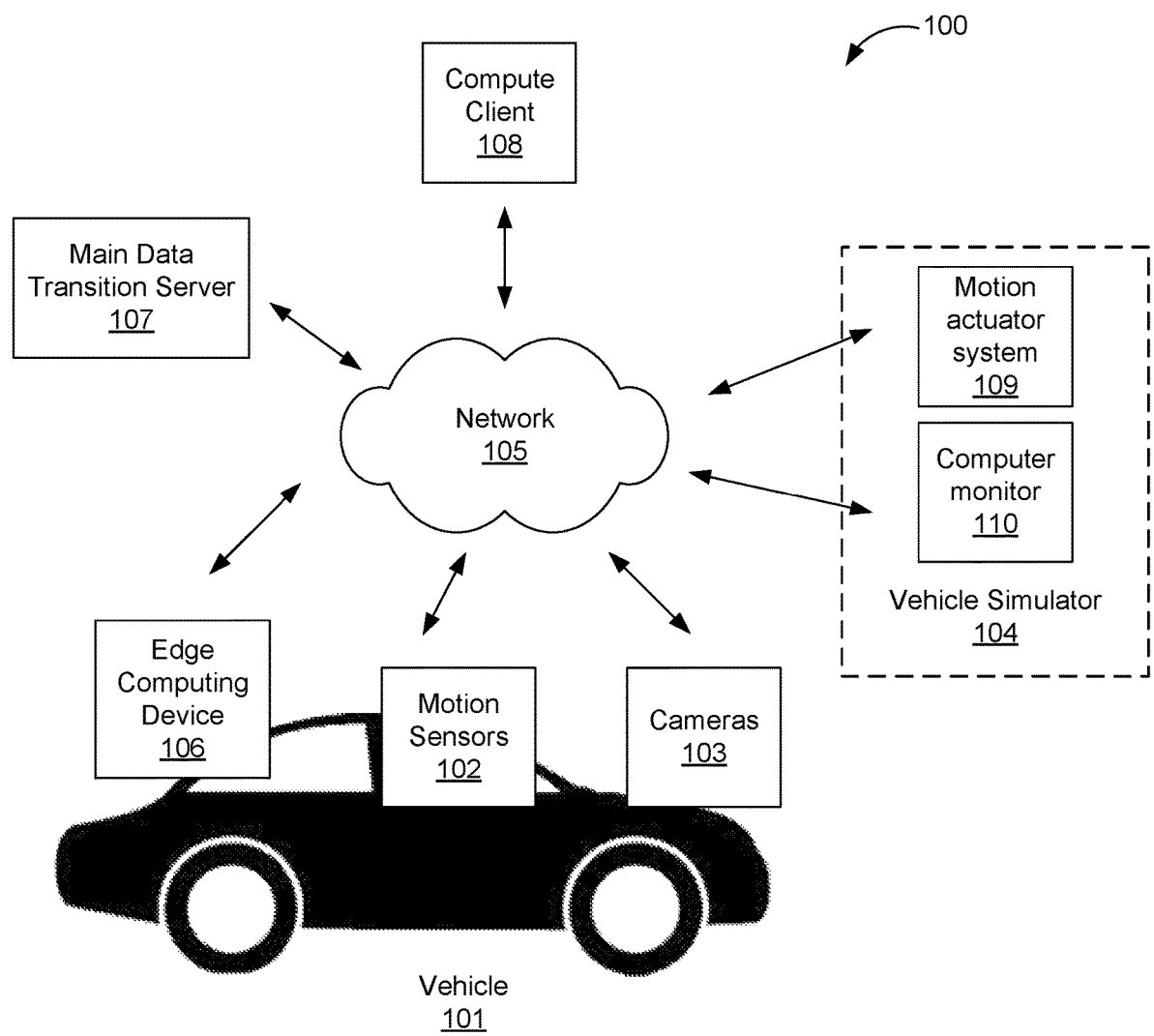
FIG. 1 depicts a system in accordance with an exemplary embodiment of the present disclosure.

FIG. 1 illustrates a system 100 in accordance with an exemplary embodiment of the present disclosure. The system 100 comprises a vehicle 101 onto which motion sensors 102 and cameras 103 have been installed. The vehicle 101 may be a race car as discussed above, for example, or other vehicles such as airplanes, boats, bicycles, or the like. The vehicle may be operated by a driver (not shown) from within the vehicle, or may be remotely operated.

The motion sensors 102 and cameras 103 record haptic data and video data, respectively, experienced by the vehicle 101 during operation of the vehicle 101. An edge computing device 106 comprises a portable far edge computing node (not shown) installed in the vehicle 101. In some embodiments, the motion sensors 102 and cameras 103 are located within the edge computing device 106.

The motion sensors 102 and cameras 103 send haptic data and video data over a network 105. The network 105 may be any type of network or networks known in the art or future-developed, such as the internet backbone, Ethernet, Wifi, WiMax, broadband over power line, coaxial cable, and the like. The network 105 may be any combination of hardware, software, or both. In one embodiment, the network 105 is an LTE 4G/5G backhaul network.

The system 100 further comprises a vehicle simulator 104 which provides a user (not shown) with a simulation of what a driver of the vehicle 101 experiences. The vehicle simulator comprises a motion actuator system 109 and one or more computer monitors 110, which provides video and audio feeds to the user.

The system 100 further comprises a main data transition server 107 that processes data received from the edge computing device 106, and a compute client 108 that receives data from the main data transition server 107 and transmits it to the vehicle simulator 104.

Figure 2:
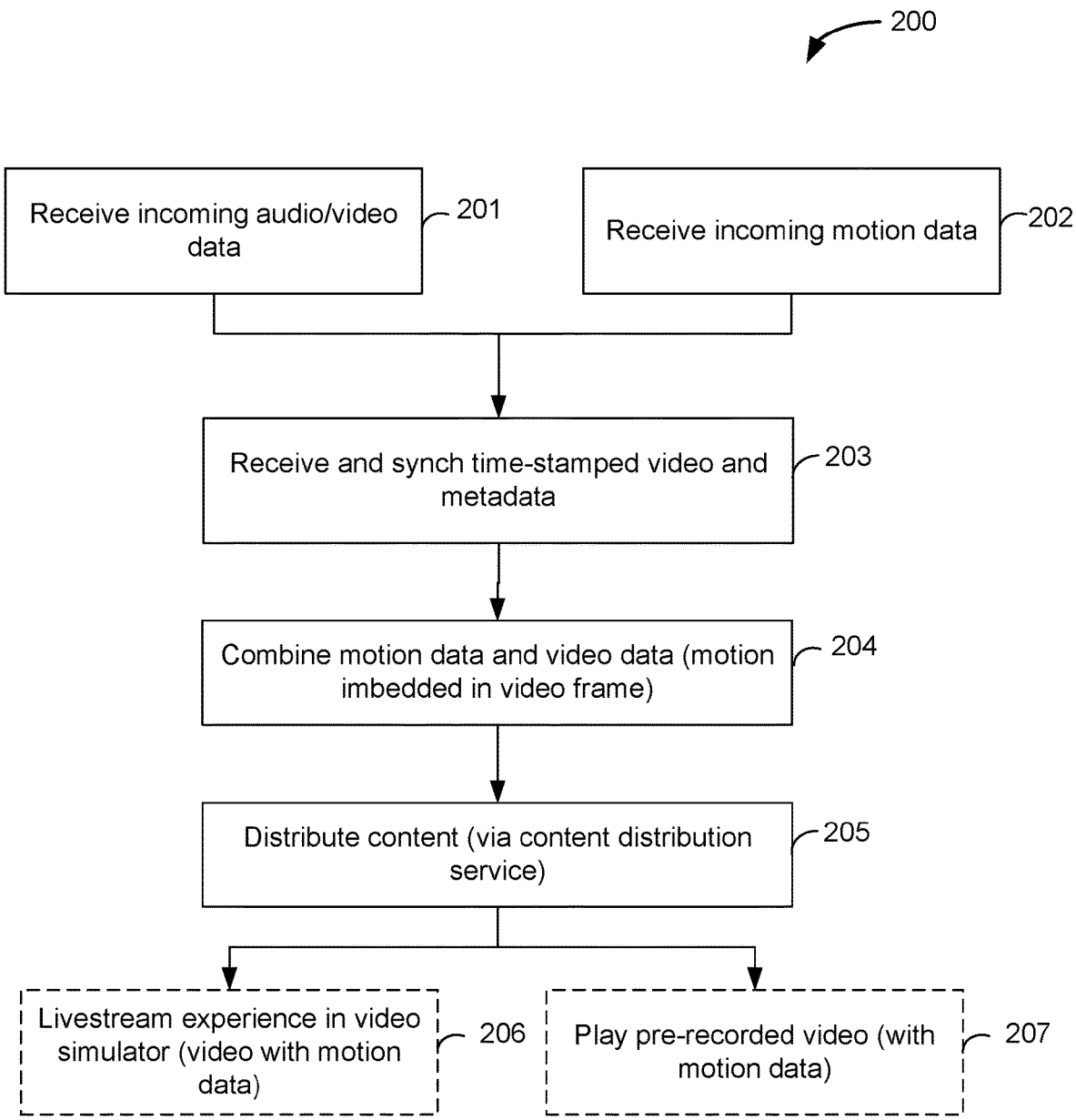
FIG. 2 is a flowchart depicting a method of embedding live motion metadata within a video frame in accordance with an exemplary embodiment of the present disclosure.

FIG. 2 depicts an exemplary method 200 of embedding live motion metadata within a video frame in accordance with an exemplary embodiment of the present disclosure. In step 201 of the method, incoming audio/video data is received from the cameras 103 (FIG. 1). In step 202, motion data is received from the motion sensors 102 (FIG. 1).

In step 203, time-stamped video with embedded metadata is received into the frame and synched. In step 204, the motion data and video data are combined.

In step 205, the combined content is sent to a content distribution service for distribution. Examples of content distribution services include streaming platforms such as Peacock, Twitch, Dirt, Google, Stadia, Netflix, Disney, YouTube, and the like.

In step 206, the user then experiences via livestream the video with motion data in the vehicle simulator 104 (FIG. 1).

Alternatively, in step 207, the user may "play" pre-recorded data to have the same experience following the live event. (Note that steps 206 and 207 are not actually steps in the method 200 of embedding live motion metadata within a video frame, but rather represent what happens with the content after distribution in step 205, as further discussed herein.)

Figure 3:
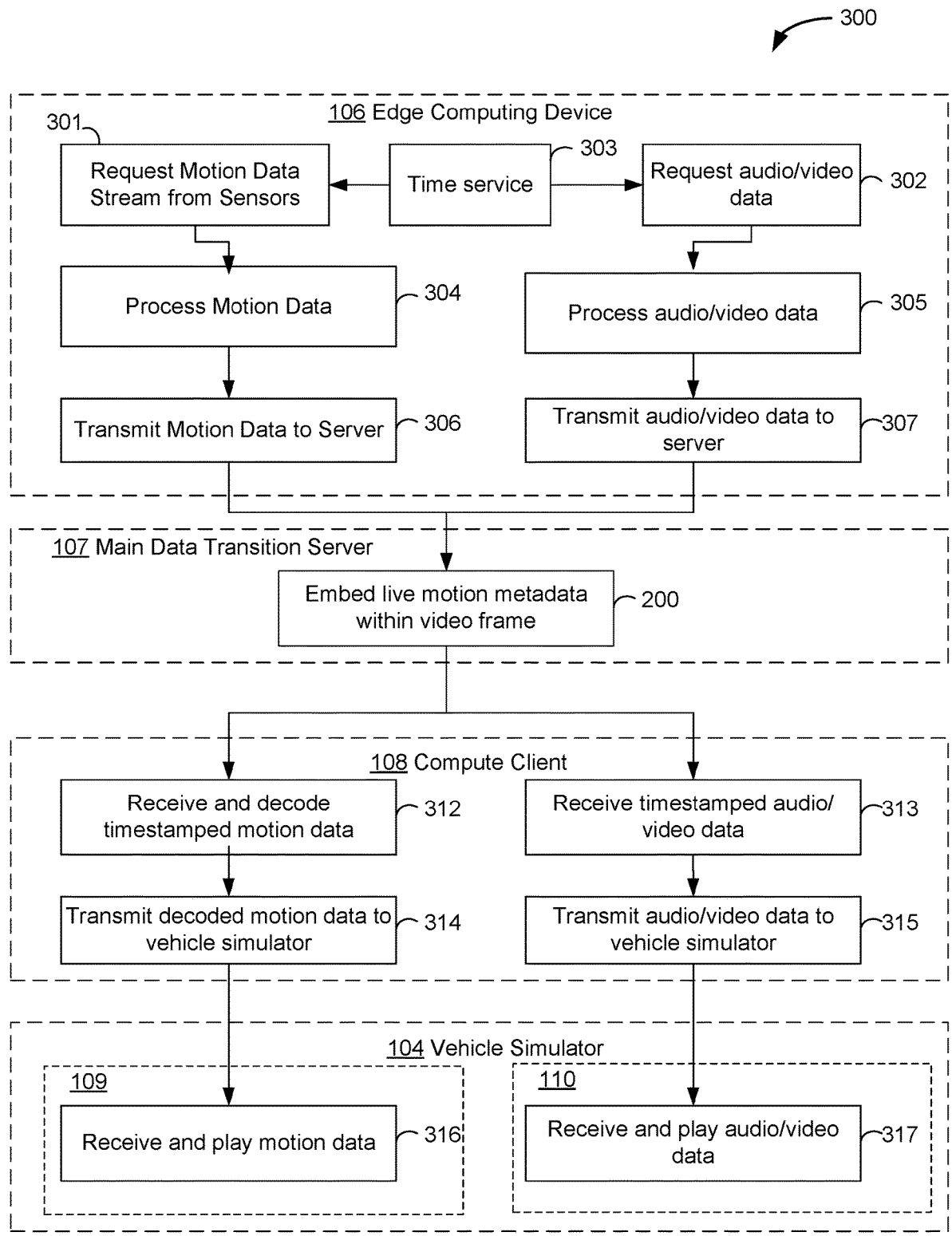
FIG. 3 is a flowchart depicting exemplary architecture and functionality of the system from the perspective of the user, in accordance with an exemplary embodiment of the present disclosure.

FIG. 3 is a flowchart depicting exemplary architecture and functionality of the system from the perspective of a user (not shown), in accordance with an exemplary embodiment of the present disclosure. In step 301, the edge computing device 106 (FIG. 1) requests motion data from the motion sensors 102 (FIG. 1) installed in the vehicle 101 (FIG. 1). In step 302, the edge computing device 106 requests audio/video data from the cameras 103 (FIG. 1) installed in the vehicle 101. A time service 303 synchs the motion data stream with the audio/video data.

In step 304, the motion data is processed in the edge computing device 106. In step 306, the motion data is then transmitted to the main data transition server 107 (FIG. 1) via the network 105 (FIG. 1). In step 305, the audio/video data is processed in the edge computing device 106. In step 307, the audio/video data is then transmitted to the main data transition server 107 via the network 105 (FIG. 1).

Next in the process the live motion metadata is embedded into the video using the method 200 discussed above with respect to FIG. 2. This process takes place in the main data transition server 107.

Then, in step 312, the compute client 108 receives the timestamped motion data from the main data transition server 107 and decodes the timestamped motion data. In step 314, the compute client 108 transmits the decoded motion data to the vehicle simulator 104 (FIG. 1). In step 316, the motion actuator system 109 within the vehicle simulator 104 plays the motion data to the user.

In step 313, the compute client 108 receives the time-stamped audio/video data from the main data transition server 107 and in step 315, transmits it to the vehicle simulator 104. In step 317, the computer monitor 110 within the vehicle simulator 104 plays the audio/video data to the user.

Figure 4:
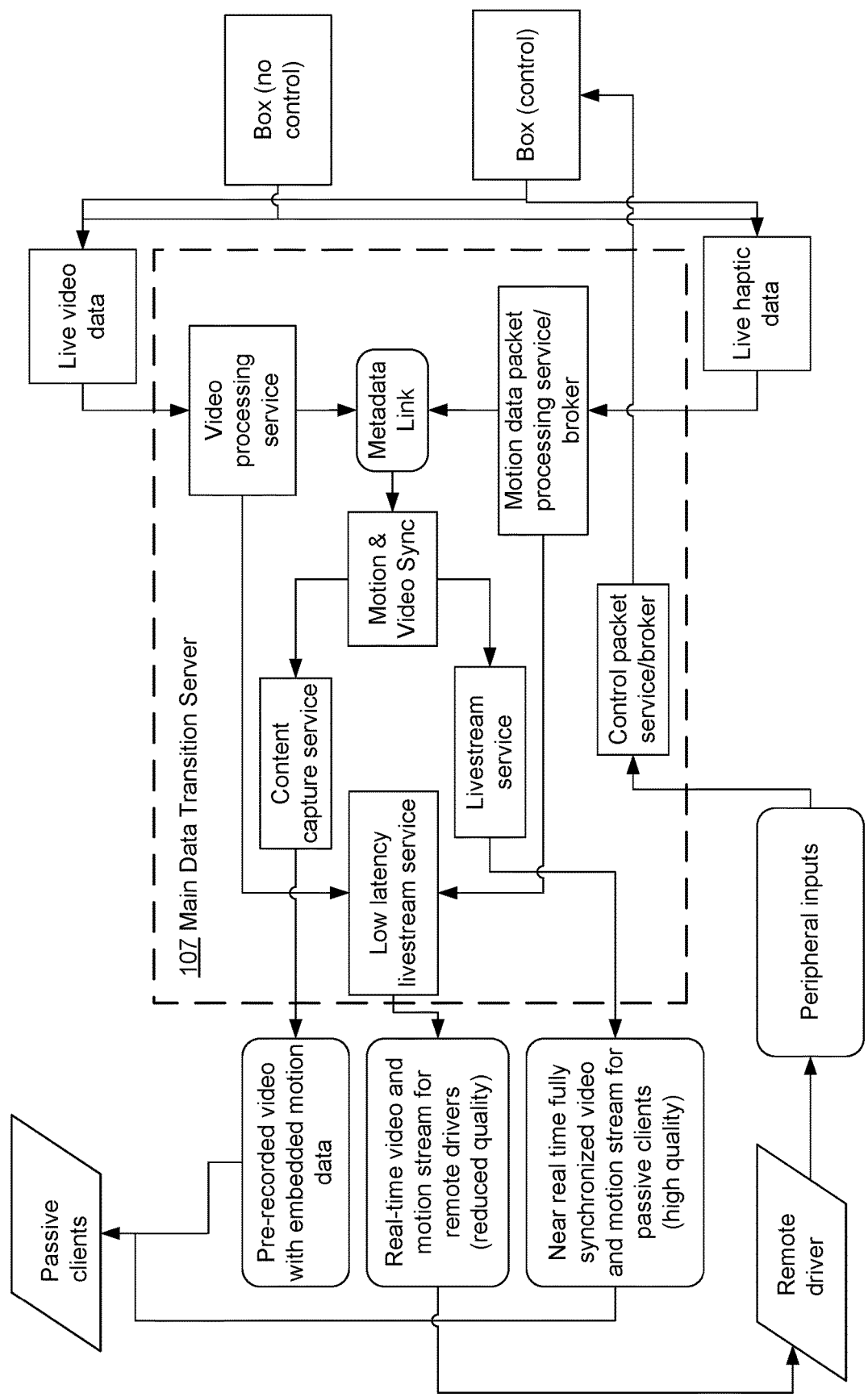
FIG. 4 is a flowchart depicting exemplary architecture and functionality of the system in accordance with an exemplary embodiment of the present disclosure.

FIG. 4 is a flowchart depicting exemplary architecture and functionality of the system in accordance with an exemplary embodiment of the present disclosure. This flowchart illustrates that livestreamed content is distributed using a separate stream at a lower quality to get the content to the livestream as quickly as possible. In contrast, where users are going to be recording the content for viewing it later, that content is distributed on a separate stream, of higher quality, but lower latency. "Passive clients" are those experiencing a simulator as a "ride-along," i.e., not operating a vehicle. A "Remote driver" is a user who is in a simulator that is operating a remote vehicle.

What is claimed is:

1. A method for capturing real-time motion data events from a remotely deployed far edge compute node on a remote asset, the method comprising:
receiving incoming audio/video data from the far edge compute node;
receiving incoming motion data from the far edge compute node, wherein the motion data comprises one or more of: linear velocity, vibration, thermal temperature, accelerometer movement, and gyroscopic data;
imbedding motion data within audio/video data frames to create distributable content; and
distributing the distributable content via a livestream experience to a motion simulator using a content distribution service.

2. The method of claim 1, wherein the remote asset is a vehicle.

3. The method of claim 1, wherein the remote asset is a racing vehicle.

4. The method of claim 1, wherein the content distribution service records the distributable content for future playback by a motion simulator.

5. The method of claim 1, wherein the motion simulator is a racing simulator system.

6. The method of claim 1, wherein the step of imbedding motion data within audio/video data frames to create distributable content is performed using a microservice architecture and is published to specific channels on a queuing service.

7. A method for capturing real-time motion data events from a remotely deployed far edge compute node on a remote asset, the method comprising:

receiving motion data event values from the far edge compute node, the motion data event values representative of real-time physical events, wherein the motion data event values comprise one or more of: linear velocity, vibration, thermal temperature, accelerometer movement, gyroscopic data, and audio;
distributing the motion data event values for livestreaming to one or more motion simulators using one or more content distribution services; and
experiencing the motion data event data via the one or more motion simulators.

8. The method of claim 7, further comprising receiving incoming audio/video data from the far edge compute note.

9. The method of claim 8, further comprising imbedding motion data within data frames of the audio/video data to create distributable content.

10. The method of claim 7, wherein the remote asset is a vehicle.

11. The method of claim 10, wherein the vehicle is a racing car.

12. The method of claim 7, wherein the one or more motion simulators are racing simulator systems.

* * * * *